D. BURHANS.
MACHINE FOR MAKING MATCH SPLINTS.

No. 106,319. Patented Aug. 16, 1870.

Witnesses:

Inventor:

United States Patent Office.

DENSLOW BURHANS, OF BURLINGTON, IOWA.

Letters Patent No. 106,319, dated August 16, 1870.

IMPROVEMENT IN MACHINE FOR MAKING MATCH-SPLINTS.

The Schedule referred to in these Letters Patent and making part of the same

*To all whom it may concern:*

Be it known that I, DENSLOW BURHANS, of Burlington, in the county of Des Moines and State of Iowa, have invented a new and useful Improvement in Machine for Making Match-Splints; and I do hereby declare the following is a full, clear, and exact description thereof, which will enable others skilled in the art to make and use the same, reference being had to the accompanying drawing forming part of this specification.

This invention relates to a new and useful improvement in machines for making splints for lucifer matches, whereby that operation is greatly facilitated, and consists in a sliding stock or frame, with an adjustable V-shaped knife and removable and independently adjustable spurs arranged thereon, and operating as hereinafter more fully described.

In the accompanying drawing.

Similar letters of reference indicate corresponding parts.

A is the stock, of rectangular form, and of any desired length and width, which is made to slide longitudinally in grooves in guide-ways.

B B are the tongues on the edges of the stock, which run in the grooves of the guides.

C is the knife which cuts the splints to the proper thickness; and

D represent the spurs, by which the splints are split.

The knife is raised from the stock the thickness of the splint, but its edges rest on rebates, on which it is fastened by the screws e.

f is a V-shaped recess in the knife, the sides g g of which are its cutting-edges.

Figure 1:
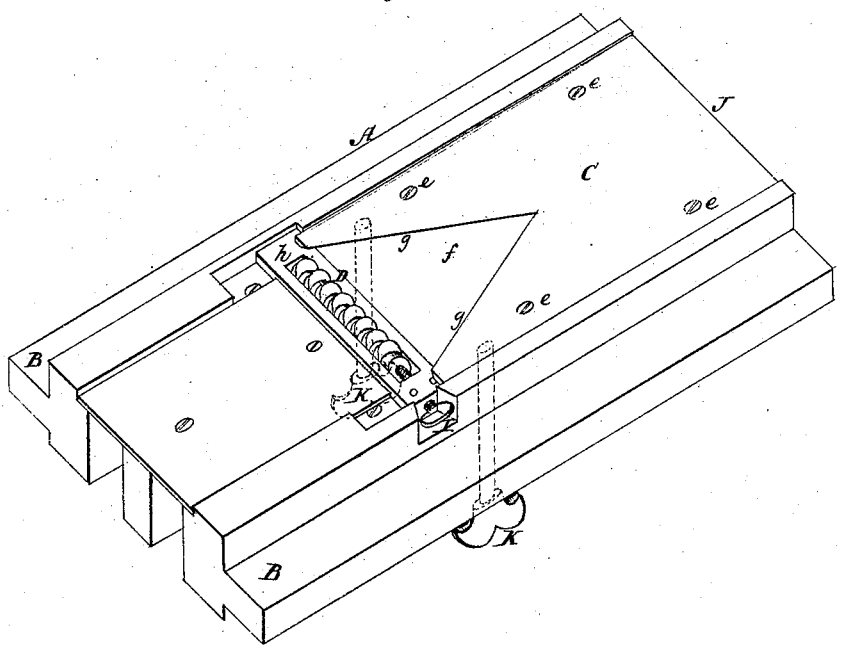
Figure 1 represents a perspective view of the machine.
Figure 2:
Figure 2 is a view of one of the spurs detached.

The spurs D are fastened in a recess in the plate h. The form of these spurs is seen in fig. 2.

They are placed in the recess one after another, where they are fastened by the thumb-screw I.

As the machine is moved on the block which is to be cut into splints, the spurs make incisions in the block lengthwise of the grain of the wood.

The end of the block having the incisions thus made on its face as it leaves the spurs comes in contact with the edges g g of the knife, by which a tier of the splints are shaved off the block, and forced under the knife and delivered from the end of the machine at J.

Instead of moving the stock A, the block which is to be cut into splints may be moved on the face of the machine, when the same or a similar result will be produced; and instead of placing the spurs in a straight line, as represented in the drawing, they may be placed in a V-shaped or other position.

The spurs, being separate, may be arranged to cut at different distances apart, and the knife may be adjusted by means of the set-screws k k (seen partly in dotted lines in the drawing) to cut thicker or thinner, as may be desired.

Having thus described my invention,

I claim as new and desire to secure by Letters Patent—

The V-shaped adjustable knife C, screws K, spurs D, slotted plate D, and clamp-screw I, arranged with relation to the stock A, and constructed as shown and described, for the purpose specified.

The above specification of my invention signed by me this 22d day of June, 1870.

DENSLOW BURHANS.

Witnesses:
GEORGE H. LANE,
J. W. PRICE.